June 2, 1936.  M. H. GROVE  2,042,781
FLOW REGULATING VALVE
Filed Jan. 6, 1932  2 Sheets-Sheet 2
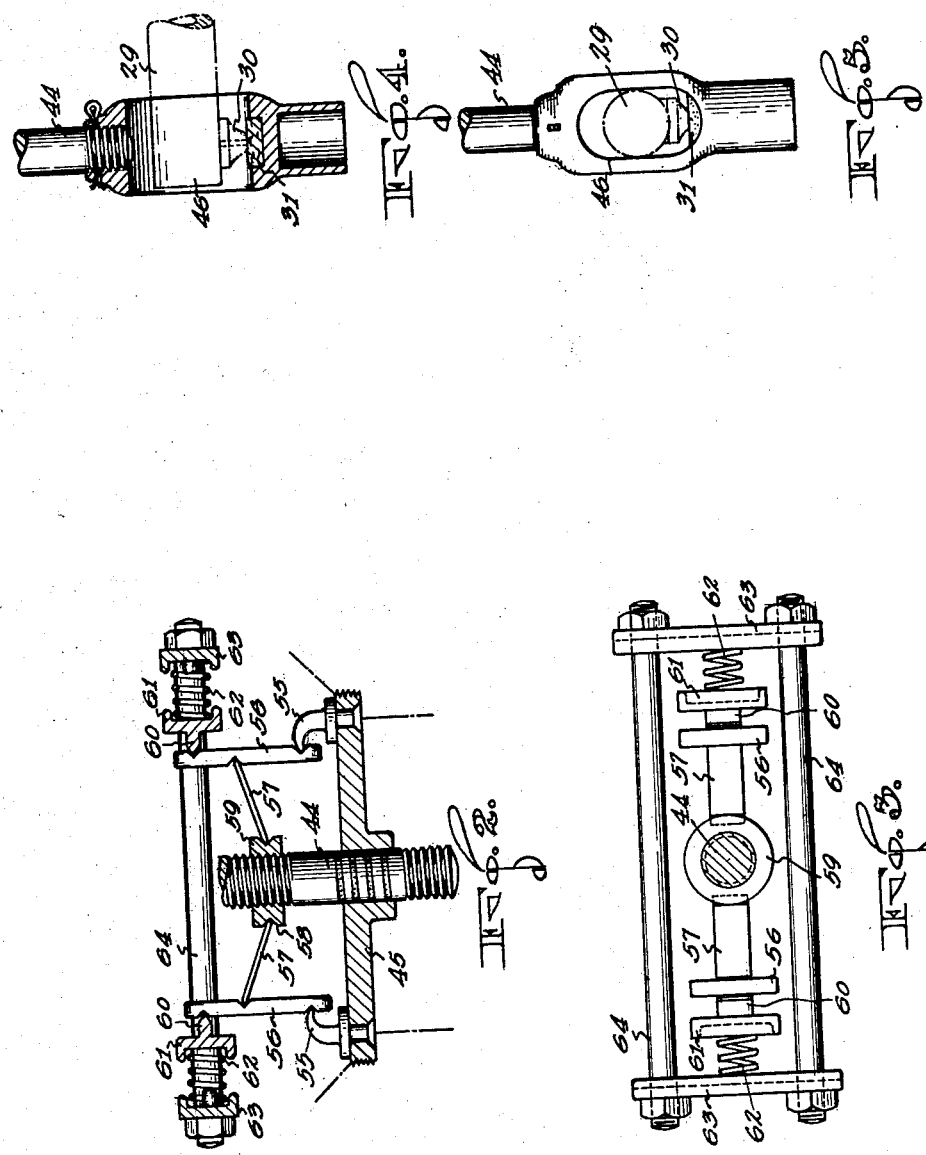
INVENTOR.
MARVIN H. GROVE.
BY
ATTORNEYS.

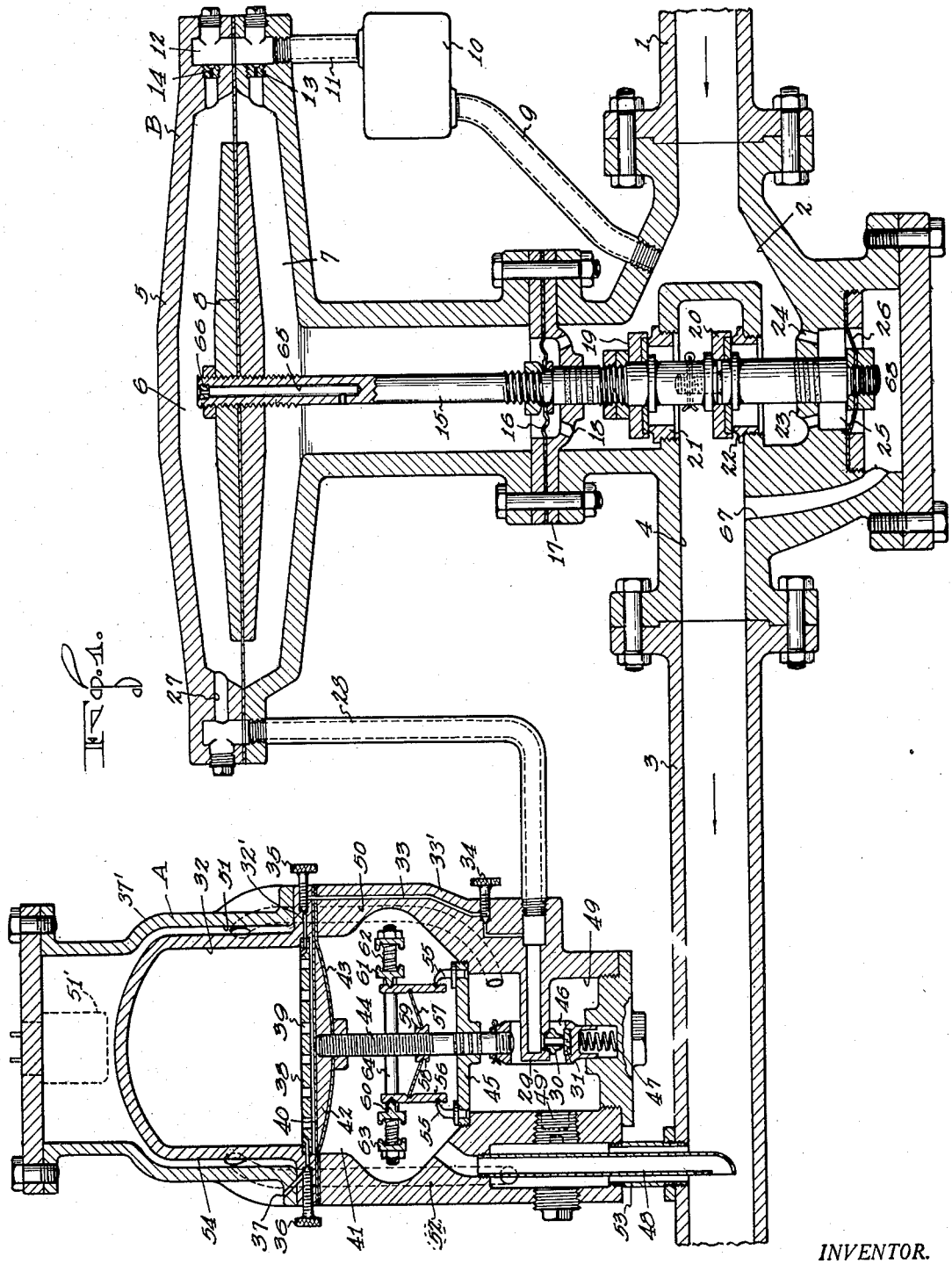

UNITED STATES PATENT OFFICE 2,042,781

FLOW REGULATING VALVE

Marvin Henry Grove, Salem, Va.

Application January 6, 1932, Serial No. 585,083

1 Claim. (Cl. 50—12)

My invention relates to improvements in regulating valves, and it consists of the combinations, constructions and arrangements hereinafter described and claimed.

I am aware of pressure-regulating valves in which fluid pressure to be controlled acts on one side of a diaphragm and a spring of fixed tension or a weight acts upon the other side of the diaphragm, the diaphragm being fastened to a valve to open and close the valve to maintain the desired pressure. Due to many forces, such as changes in the high pressure, etc., constant movement of the valve is required to maintain this pressure. The faster the valve will adjust itself for constantly changing conditions, the more even the regulation. Due to inertia to be overcome, springs or weights are slow in operation, with consequent uneven regulation. My device employs the expansive power of a gas under pressure as the source of power to move the valve in place of the spring or weight, with the result that the movement is almost instantaneous, since there is no inertia to be overcome other than the weight of the moving parts. The result attained is practically a smooth flow, which is really the object to be attained in most applications rather than pressure regulation.

One of the principal objects of my invention is to provide a device of the type described, in which novel means is provided for taking care of variations in temperature, so that the valve will operate as desired regardless of these changes. I also provide means for automatically compensating for the enlarging of the capacity of the control compartment, whereby the control valve operated by a diaphragm forming a part of the control compartment will be moved with an equal force throughout its entire distance, even though the diaphragm in flexing, enlarges the capacity of the control compartment and thus reduces the pressure within the compartment.

Still another object is to provide a controlled valve with all the desirable smooth flow characteristics of a balanced valve, and, at the same time, with identical tight shut-off features of a single bevel-seated valve.

Still another object is to provide means for permitting fluid pressure on one side of the operating diaphragm of this controlled valve to pass into the compartment disposed on the other side of the diaphragm and thus cause the valve to open without sudden jerk and at the same time cause it to move toward the closed position more rapidly.

Other objects and advantages will appear in the following specification, and the novel features of the device will be particularly pointed out in the appended claim.

My invention is illustrated in the accompanying drawings forming a part of this application, in which Figure 1 is a sectional schematic view of the entire device;

Figure 2 is an enlarged sectional view of a portion of the control valve;

Figure 3 is a top plan view of Figure 2;

Figure 4 is an enlarged sectional view of the control valve; and

Figure 5 is an end elevation of Figure 4.

In carrying out my invention, I provide a control valve, indicated generally at A, and a controlled valve, indicated generally at B. A high pressure gas-conveying pipe 1, (see Figure 1), communicates with an inlet 2 of the controlled valve, while a low pressure conveying pipe 3 communicates with an outlet 4 of the controlled valve.

It is best to describe first the path taken by the high pressure gas passing from pipe 1 and then to show how this controls the pressure of the low pressure gas, regardless of the amount of gas being withdrawn from the low pressure line 3. The valve B has a head 5 divided into two compartments, or chambers 6 and 7, by a diaphragm 8. A conduit 9 conveys high pressure gas from the inlet 2 to a filter 10, and a second conduit 11 conveys the high pressure gas from the filter 10 to a passage 12 in the head 5. An orifice 13 permits flow of high pressure gas from the passage 12 into the chamber 7, while a second orifice 14 permits high pressure gas to enter the compartment 6. It will be seen that high pressure gas will fill the compartments 6 and 7, and as long as gas does not escape from either compartment faster than it can enter through the orifices 13 and 14, there will be a balancing of forces on both sides of the diaphragm 8 to move the valve stem 15, which is fastened to the diaphragm 8.

The valve stem 15 passes through a diaphragm 16 that separates the compartment 7 from the inlet 2. A guide plate 17 has openings 18 therein for permitting the high pressure in the inlet 2 to force against one side of the diaphragm 16, and high pressure in the chamber 7 to force against the other side of the diaphragm. There will therefore normally be a balancing of the forces on both sides of the diaphragm 16.

A partition 23 acts as a guide for the lower portion of the valve stem 15, and this partition has openings 24 therein for leading the high pressure gas into a compartment 25 closed by a diaphragm 26. On the opposite sides of this diaphragm, in a compartment 68, is the low pressure gas, since this compartment is connected with the low pressure pipe 3 by a passage 67. Thus, we have the pressure differential between the high and low pressure acting on the diaphragm 26 to keep the valve closed.

The diaphragm 8, through the valve stem 15, actuates a double valve 19 and 20. The valves 19 and 20 are normally seated on valve seats 21 and 22, and the high pressure gas in the inlet 2 will exert a force on the top of the valve 19 and on the bottom of the valve 20, so as to balance the forces.

Communication is established between the compartment 6 of the valve B and the control valve A. A passage 27 in the head 5 places the compartment 6 in communication with a conduit 28. The control valve A has a conduit 29 communicating with the conduit 28, and a valve orifice 30 is carried by the conduit 29 and is normally closed by a movable valve seat 31. Thus far, I have described the various passageways and compartments occupied by the high pressure gas. I will now describe the control compartment and then will set forth how this compartment keeps the pressure of the gas in the low pressure line 3 at a pressure to deliver equal amounts of gas by weight from the pipe 3, regardless of temperature change.

The control valve has a control compartment 32 therein, which is placed in communication with the conduit 28 by means of a passage 33, this passage being controlled by needle valves 34 and 35. The operator opens the needle valves so as to allow any desired pressure to be built up in the control compartment 32, whereupon, needle valves 34 and 35 are closed. The pressure in the control compartment 32 is less than the pressure in the conduit 28. If it is desired to lessen the pressure in the control compartment, a needle valve 36 is opened and permits flow through an exhaust passage 37 to the atmosphere. Pressure gauges, not shown, may be used on the control compartment 32 for indicating this pressure.

One wall 38 of the compartment 32 is perforated, as at 39, and permits the gas pressure in the compartment to exert a force on a diaphragm 40 that separates the control compartment 32 from a compartment 41.

A plate 42 separates the diaphragm 40 from a second diaphragm 43, and a valve stem 44 is secured to the plate. This valve stem 44 passes through the compartment 41, thence through a partition 45, and is provided with a yoke 46 at its lower end, this yoke carrying the valve seat 31. A spring 47 normally keeps the stem 44 raised, and aids the gas pressure on diaphragm 43 in keeping the valve 30 normally closed. The provision of two diaphragms 40 and 43 permits the stem 44 to be connected to the diaphragm 40 without puncturing it.

Assume that a pressure of two ounces is trapped in the control compartment 32 and that a pressure of 100 pounds is exerted by the gas in the pipe 1 and in the conduit 28. There will be no pressure in the compartment 41 until the pressure of two ounces is built up in the low pressure line 3, because the compartment 41 communicates with the low pressure line by means of a conduit 48. The pressure of the gas in the compartment 32 will therefor move the diaphragms 40 and 43 downwardly, and this will cause the valve stem 44 to move the valve seat 31 away from the valve 30. Immediately, the gas under a higher pressure; i. e. 100 pounds, will flow into a compartment 49 and then will be carried by a passageway 50 into a compartment 51 that envelopes the control compartment 32. From here, the gas will enter a passage 52, and thence to a pipe 53 that communicates with the low pressure pipe 3. The gas will flow until the pressure in the low pressure pipe 3 and likewise the pressure in the compartment 49, since compartment 49 and pipe 3 are connected by passage 48, has risen in pressure to slightly more than two ounces, and the diaphragms 40 and 43 will move upwardly since the pressure in the compartment 41 is sufficient to overcome the pressure in the control chamber 32. Thus, the diaphragms 40 and 43 will lift the valve stem 44 and close the valve 30 and further flow will cease.

Before proceeding further with the operation of the device, it is best to set forth how the temperature of the gas in the control compartment is controlled. The gas, in passing through the valve orifice 30, is reduced in pressure since it is allowed to expand in the compartment 49, and this reduced pressure will closely approximate the two ounces maintained in the pipe 3. The temperature of the gas in the compartment 49 will therefore closely approximate the temperature of the gas in the pipe 3 because the drop in pressure at both places is the same. It will be noted that the gas from the compartment 49 passes through the compartment 51 and thus maintains the temperature of the gas in the control compartment 32 the same as the gas in the low pressure pipe, since this compartment is almost entirely surrounded by low pressure gas, and the heat transfer from one compartment to the other is accomplished by conduction. The gas in the control compartment 32 will never be at a different temperature from the gas in the low pressure pipe 3.

If, for example, the temperature of the gas in the control compartment 32 were allowed to rise above that of the gas in the pipe 3, such as may be caused by a rise in the temperature of the surrounding atmosphere, we would have a corresponding rise in pressure, since the volume of this chamber is constant, and this, in turn, would cause a rise in pressure in the pipe 3. The rise in pressure in the pipe 3 would take place in order to move the diaphragm 40 upward and close the valve 31.

It is obvious, therefore, that we must have means of controlling the temperature of the gas in the control compartment 32 if we wish to have the same amount of gas by weight flow in the pipe 3, regardless of temperature.

In this particular device, in which we control the flow of a fluid such as illuminating gas where quantity of gas flowing is desired, we automatically raise the pressure of the gas in the low pressure pipe 3 to compensate for a temperature rise. Vice versa, we lower the pressure of the gas in the pipe 3 if the temperature of the gas drops. This is desirable since the gas is less dense if the temperature is high than if the temperature is low.

If, for example, my device were controlling the flow of gas passing through a meter, and the gas were subject to changes in temperature, my device would automatically adjust the pressure of the flowing gas such that the meter would record the correct quantity of gas passing through the meter. With an ordinary pressure regulator, it would be necessary to record the temperature of the gas and correct the meter readings. It is desirable, in this manner, to control the flow of any fluid where quantity control is desired.

However, in controlling the flow of steam, compressed air, etc., where a constant pressure control is desired (since it is energy stored in the gas by its compressed state which is used rather than the fluid itself), I must have means of maintaining a constant pressure in the control chamber. I accomplish this by closing off passages 50 and 52 and removing the plug 49'. Thus, I will not subject the gas in the chamber 32 to the pressure changes that occur in the pipe 3. However, I must further provide against any change of temperature that might be induced by the gas in the chamber 41 or any outside cause such as atmospheric. I accomplish this by providing a heating element 51' in the compartment 51 that will automatically maintain the temperature of the gas in the chamber 32 above that of any temperature it may be subjected to from any outside source.

I provide novel means for automatically compensating for the enlarging of the control compartment so that the same force will be exerted on the valve stem 44 during the entire movement of the stem. Fulcrum edges 55, (see Figure 2), are carried by the partition 45, and levers 56 are pivoted on the edges. Links 57 extend from the levers 56 and fulcrum in notches 58 on a nut 59 carried by the valve stem 44. Figure 3 shows how the tops of the levers 56 are fulcrumed on knife edges 60 carried by cup-shaped members 61. Springs 62 extend between the members 61 and supports 63. The supports, in turn, are carried by rods 64. If desired, the rods can be supported in bearings (not shown).

The links 57 will exert a certain downward force on the valve stem 44 when the links are in the position shown in Figure 2. If the volume of the compartment 32 increases in size, the pressure will decrease, and this pressure decreases as the valve stem 44 moves downwardly. The downward movement of the valve stem 44 increases the angle of the links 57, and, therefore, the springs 62 will cause the links to exert a greater downward force as the links swing through an angle. The force of the springs 62 may be adjusted so that the gradual increasing of the downward force of the links on the valve stem will equal the gradual decreasing of the force of the gas pressure in the compartment 32 on the diaphragm 40. In this way, the mechanism shown in Figures 2 and 3 automatically compensates for the decrease in pressure in the compartment 32.

The compartments 6 and 7 are placed in communication by a passage 65 and an orifice 66 for a purpose hereinafter described.

If the amount of gas withdrawn from the pipe 3 were more than the orifices 13, 14 and 66 could handle, we would have a pressure drop in the compartments 6 and 7. These orifices are of such size that the pressure drop in the compartment 6 will be greater than the pressure drop in compartment 7.

When the differential pressure acting on the diaphragm 8 is sufficient to overcome the force exerted by the diaphragm 26 and the weight of the moving parts of the valve, valves 19 and 20 will move upwardly and gas will flow from the inlet 2 into the low pressure pipe 3. The provision of the orifice 66 causes the valves 19 and 20 to lag slightly in opening. This prevents chattering, and the valves will open to the desired amount.

As soon as pressure in the low pressure pipe 3 exceeds two ounces, the valve 30 will be shut off and will stop the flow out of the compartments 6 and 7. The pressure will then equalize rapidly in the compartments 6 and 7, due to the orifice 66 while gas is flowing into them through the orifices 13 and 14, and the diaphragm 26 will shut off the valve B more quickly than if the orifice 66 were not provided.

I have so far described the forces which operate my valve. In actual operation, the valve 31 is constantly and rapidly opening and closing to maintain the proper differential pressure acting on the diaphragm 8 such that the valves 19 and 20 will maintain the proper opening to keep the quantity of gas passing these valves at the correct amount to maintain an even pressure of two ounces in the pipe 3.

It should be noted that any regulating valve is subject to forces which move the valve out of the correct position at any given instant, such as constantly changing pressure in the compartment 2, eddy currents flowing past the valve which act upon the valve, etc. The valve must be constantly adjusting its position to maintain an even flow. My principle permits this adjustment very rapidly.

However, there is another factor which must be considered; i. e. any bevel-seated or poppet valve must have a seat ring, and each time the valve moves off its seat, there is the force of the pressure on this area suddenly acting on the valve to open it.

This force suddenly acts upon a partially-opened valve and is added to the force that is sufficient to open the valve, with a result that the added force of the flowing gas tends to cause the valve to move farther open than is necessary. To overcome this, I have held in check the pressure differential between the chambers 6 and 7 by permitting a predetermined flow of gas from the chamber 7 into the chamber 6 when the pressure is reduced in the chamber 6. This orifice 66 also allows the diaphragm 8 to be relieved of its differential pressure more quickly when the valve 30 is closed, with a result that more rapid application of closing force is applied on the valve B.

It should be noted that a single seated valve has very uneven flow characteristics, but has about the correct shut-off characteristics. I have employed a so-called balanced valve in valve B with the desirable flow characteristics of this type of valve, but by using composition seats on the valves 19 and 20 and by using the diaphragm 26, I have secured the advantages of both the single-seated valve and the balanced valve.

It should be noted that the lower side of the diaphragm 26 could be exposed to the atmosphere with the same effect as is shown if only one low pressure is desired, and the area of the diaphragm 26 is considered in the design in accounting for the added closing effect of the low pressure on the valve B.

The provision of the orifice 66 not only causes a lag in the valve opening movement of the diaphragm 8 when fluid is withdrawn from the chamber 6, but it also permits the more rapid equalization of pressures in the chambers 6 and 7 when fluid is stopped from being withdrawn from the chamber 6, with a result that the pressures in the chambers 6 and 7 will balance before they will equal that in the high pressure line, and the high pressure on the diaphragm 26 will then instantly close the valves 19 and 20, after which the pressures in the chambers 6 and 7 will build up to normal.

It will be seen from the description that I provide a device that will maintain a predetermined pressure at a predetermined temperature in a low pressure pipe and automatically compensate for temperature changes by pressure changes.

While I have shown only the preferred form of my invention, it should be understood that various changes or modifications may be made within the scope of the appended claim without departing from the spirit of the invention.

I claim:

In a control valve, a casing, a dome-shaped member having a flange with inlet and outlet passages in the flange leading to the interior of the member, needle valves for the passages, a diaphragm closing the dome-shaped member, a valve stem supporting member disposed adjacent to the diaphragm, a second diaphragm placed on the other side of the supporting member, and a valve stem extending through the second diaphragm and being secured to the supporting member, said diaphragms and dome-shaped member being secured to the casing.

MARVIN HENRY GROVE.